United States Patent [19]
Ruberte

[11] 3,987,873
[45] Oct. 26, 1976

[54] BRAKE MECHANISM

[76] Inventor: Antonio Lafuente Ruberte, Carretera de Valencia Km., Zaragoza, Spain

[22] Filed: Feb. 15, 1974

[21] Appl. No.: 442,846

[30] Foreign Application Priority Data
Aug. 29, 1973 Spain .................................. 418320

[52] U.S. Cl. .................................. 188/267; 74/467; 184/6.12; 184/11 A; 188/264 B; 188/264 P; 310/105
[51] Int. Cl.² ........................................ H02K 49/04
[58] Field of Search ........ 188/267, 290, 296, 264 B, 188/264 P, 161–164; 184/6.12, 11 A; 74/467; 310/105; 180/43 B, 60, 62, 65 F

[56] References Cited
UNITED STATES PATENTS

| | | | |
|---|---|---|---|
| 1,259,861 | 3/1918 | Henry | 310/105 |
| 2,012,698 | 8/1935 | Terrill | 310/105 X |
| 2,027,218 | 1/1936 | Armington | 180/62 X |
| 2,130,528 | 9/1938 | Alexander | 188/267 X |
| 2,287,953 | 6/1942 | Winther | 310/105 |
| 2,743,627 | 5/1956 | Christenson | 188/264 P |
| 3,042,145 | 7/1962 | Bixby | 184/6.12 |
| 3,182,527 | 5/1965 | Bryan | 74/467 X |
| 3,185,261 | 5/1965 | Campbell et al. | 188/296 X |
| 3,770,074 | 11/1973 | Sherman | 180/43 B X |

FOREIGN PATENTS OR APPLICATIONS
1,267,191   6/1961   France .............................. 310/105

*Primary Examiner*—George E. A. Halvosa
*Attorney, Agent, or Firm*—Edward F. Connors

[57] ABSTRACT

A brake mechanism, applicable to the braking of trailer vehicles, has an electro-magnetic arrangement which is disposed between the inner ends of coaxial wheel supporting shaft units to selectively and individually control the rotation thereof. Each shaft unit has a gearing arrangement for transmitting the braking action to the wheels. Oil is circulated between the spaces of the stationary and moving parts of each shaft unit. And the production of air pressures from heat generated by the functioning of the units is eliminated.

6 Claims, 3 Drawing Figures ns in accordance with the present invention.

BRAKE MECHANISM

BACKGROUND OF THE INVENTION

1. Field Of The Invention

The present invention generally appertains to new and novel improvements in brake mechanisms and especially relates to a new and novel controlling and braking means for the ground engaging wheels of a towed vehicle.

2. State Of The Art

While the brake mechanism of the present invention has general and broad utility, it is particularly designed for use in a vehicular environment and has special application in connection with the ground engaging wheels of a towed or trailer vehicle.

Such vehicles have at least one set of coaxially aligned wheels which are provided with a common brake means so that each application of the brakes produces a simultaneously similar decelerating effect on the wheels.

If there is a breakdown in such a common braking arrangement, then both of the wheels are devoid of any decelerating means. And also such a braking arrangement fails to take into functional consideration the directional changes of the vehicle wherein the braking action should be greater on the wheel that makes the wider or outside movement.

SUMMARY OF THE INVENTION

A primary object of the present invention is to provide an independently operating braking means for each of the coaxially aligned wheels of a trailer or towed vehicle so that each wheel is braked independently of the other companion wheel.

A further important object of the present invention is to produce such an independent braking action by means of an electro-magnetic mechanism arranged centrally between coaxial shaft units for the ground engaging wheels with the electro-magnetic mechanism being selectively operable to create an independent decelerating action on each wheel so that if one wheel malfunctions there will be a sufficient braking force on the other wheel to stop the vehicle and so that directional changes of the vehicle are taken into consideration in the application of braking forces to the wheels.

Another important object of the present invention is to provide a transmission system including a gearing arrangement for transmitting the braking force of the electro-magnetic unit through the separate and individual shaft units to the wheels.

A further important object of the present invention is to provide a lubricating means and an air pressure eliminating means for said shaft units and the transmission systems embodied thereby.

Another most important object of the present invention is to provide a simple, compact, inexpensive and reliable brake mechanism that has general application to any rotary assembly but which has special, though not restrictive, application to the wheels of a vehicle, especially a towed one.

DESCRIPTION OF THE PREFERRED EMBODIMENT

Figure 1:
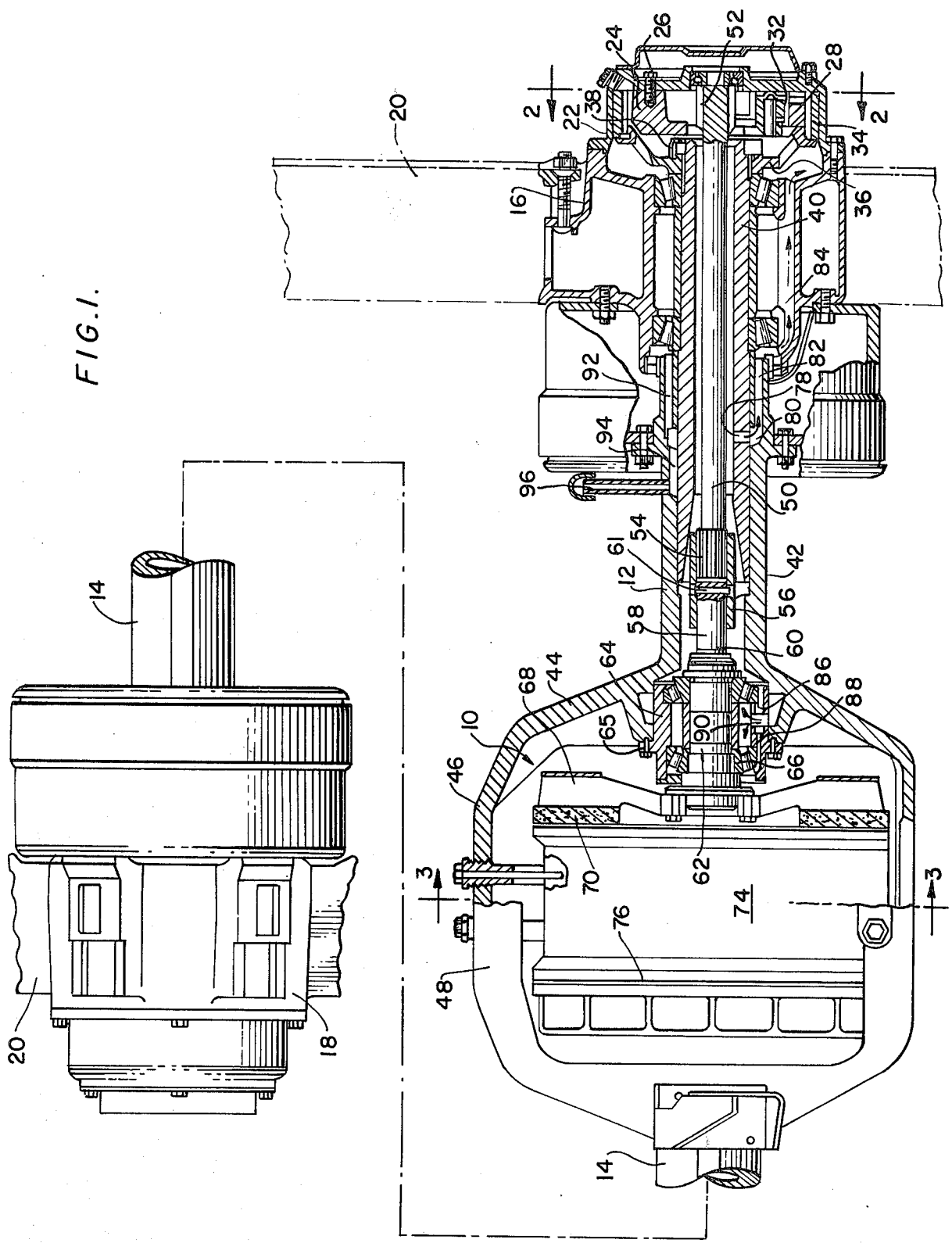
FIG. 1 is an elevational view, partly in vertical section, of a wheel assembly provided with a brake mechanism in accordance with the present invention.

Referring now more particularly to the accompanying drawings, the reference numeral 10 generally designates an electro-magnetic brake means, which is commonly disposed between axially aligned shaft units 12 and 14. The shaft units extend from opposite sides of the electro-magnetic brake means 10 and support hubs 16 and 18 for coaxially aligned ground engaging wheels 20.

In the illustrated environment, the ground engaging wheels 20 are provided for a towed or trailer vehicle (not shown). However, the brake mechanism can be employed with wheels of a driving vehicle. And also, it is to be understood that the brake mechanism is not limited to a vehicular environment. It can be used in any environment where there are rotating shaft units that are to be decelerated or braked.

In the illustrated environment, each of the shaft units 12 and 14 is identical in construction and operation so that a detailed description will be given only of the shaft unit 12, which is shown in section in FIG. 1. As shown therein, the hub 16 is solid with a gear case 22 within which an axle 24 is mounted. The axle is secured to the case 22 by bolt means 26 so that the axle is solid with the gear case 22 and hub 16.

Figure 2:
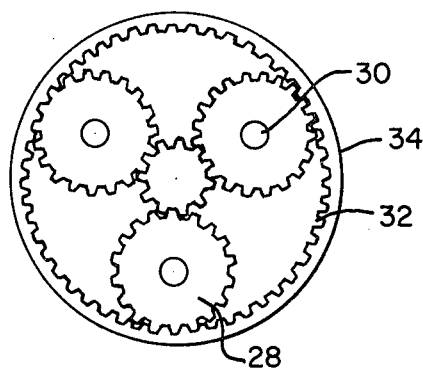
FIG. 2 is a cross-sectional view taken on line 2—2 of FIG. 1.
Figure 3:
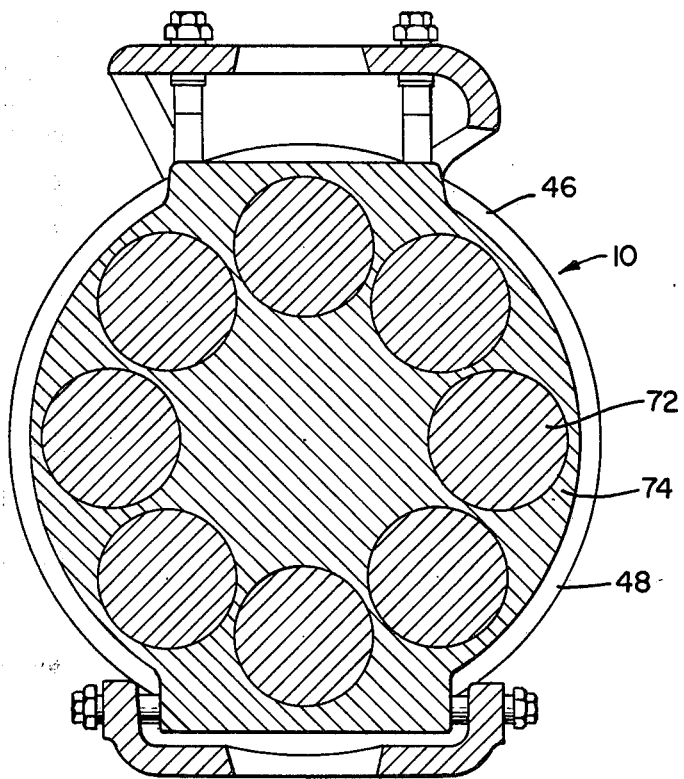
FIG. 3 is a cross-sectional view taken on line 3—3 of FIG. 1.

The axle 24 supports a set of planet pinions 28, which are preferably three in number, as shown in FIG. 2, and which are rotatably mounted on shafts 30 which are eccentrically disposed between the gear case 22 and the axle 24, as shown in FIGS. 1 and 2.

The entire assembly, which is composed of the hub 16, the gear case 22, the axle 26 and the planet pinions 28 rotates as a unit when the ground engaging wheel 20 rolls on the ground as the vehicle moves. This causes the planet pinions 28 to turn on their supporting shafts 30.

The pinions are meshed with the internal gearing 32 of a crown wheel 34, as shown in FIG. 2, so that the pinions 28 walk around the crown wheel 34 which does not turn but which is united in a stationary manner with a crown support 36 that is connected by pins 38 with a stationary sleeve 40. The sleeve 40 extends within the tubular extension 42 from one half 44 of a bell housing 46 for the electro-magnetic means 10. The corresponding half 48 of such housing supports the shaft unit 14 with the halves of the housing being bolted together.

The rotary movement of the planet pinions 28 is transmitted to a shaft 50 which is coaxially disposed within the sleeve 40 and which has an outer toothed end 52 engaged by the planet pinions and which has an inner splined end 54 socketed within a connective sleeve 56. The sleeve 56 receives the outer end 58 of a shaft 60 with such end being secured by a pin 61 to the sleeve.

The shaft 60 has its inner end 62 mounted in a bushing 64 within the casing section 46 with the bushing being secured by pins 65 to the casing section. Bearing mans 66 are provided to rotatably support the inner end 62 within the bushing 64. The end 62 of the shaft 60 carries a flywheel or rotor 68 which has magnetic pads 70 on its inner face and which are adapted to engage a series of circumferentially arranged windings 72 mounted within the stator 74.

The windings are on opposite faces of the stator and can selectively engage the rotor 68 for the shaft unit 12 or the rotor 76 for the shaft unit 14, thereby enabling selective and differing deceleration effects to be applied to the shaft units 12 and 14.

When the inductive system is excited by circuitry (not shown) from a remote point, as from the cab of the towing vehicle, the flywheels 68 and 76 cut the lines of force to the magnetic field. There are created in them stray or eddy currents which give rise to the resulting force that opposes the rotary movement of the flywheels 68 and decelerates them or brings them to a complete stop.

The braking couple is also a function of the speed of the flywheels 68 and 76 so that the greater the speed of such flywheels, the greater the cutting of the lines of forces and, therefore, the greater the resulting force opposed to the rotary movement. This action of braking is transmitted to the ground engaging wheels 20 on each side independently through the corresponding shafts 50 following an inverse transmission process of the movement of the induced flywheels 68 and 76.

The deceleration of the rotary movement of the shafts 50 of each of the shaft units 12 and 14 is transmitted by the epicycloidal gear train with the satellite pinion gears engaging with the revolving central shaft 50 whose purpose is to transmit the couple from the electro-magnetic means 10 to the wheels through the gear case and hub.

By virtue of the splined connection between the rotary shaft 50 and the connective sleeve 56 and the crosswise pinning of the sleeve to the shaft 60 the coupling between the two shafts is achieved with predetermined mechanical play. This makes it possible to absorb certain differences of axial alignment between the shafts. Also the coupling constitutes a zone for permitting axial extensions of the shafts in following the pulling action of the electro-magnetic means 10.

In order to achieve a reliable functioning of the brake mechanism and to avoid possible freezing of the parts and eliminate wear therebetween, such as will prematerially deteriorate the mechanism, a lubricating system is provided for circulating a lubricating fluid within a closed circuit.

As shown in FIG. 1, a series of communicating ports and passages 78, 80, 82 and 84 are respectively provided in the sleeve 40, the housing shaft 42 and the hub 16. This will facilitate the passage of oil between the mechanical spaces of all of the stationary and moving parts of the shaft units 12 and 14.

The circulatory movement of the oils is produced when the vehicle is started at which moment the oil is driven by the pinion gears of the gearing system to flow in the direction of the arrows, as shown in FIG. 1. The oil flows between the shaft 50 and the sleeve 40 and enters the passage 82 through the ports 78 and the orifice 80 and then flows into the passage 84 and back to the gear housing, as shown by the arrows in FIG. 1.

The same thing happens for the bushing 64 which acts as a support for the flywheel shaft 62 and which is provided with conduits 86 and 88 and a port 90 through which the oil circulates in the manner indicated by the arrows in FIG. 1.

To avoid air pressures that could be produced in the shaft units by the heat generated from the functioning movement of the rotating parts relative to the stationary parts, there is provided an atmospheric venting system whereby such air pressures are eliminated.

Thus, as shown in FIG. 1, there is a communicating system of conduits 92 and 94 which are in communication with a vent pipe 96. In this fashion, the interior of the gear case and the space surrounding the shaft 50 along its full axial extent are vented to the atmosphere.

It can thus be seen that the present invention provides a simple and effective brake mechanism for decelerating and braking the ground engaging wheels of a trailer or towed vehicle. It achieves a decelerating effect of the speed of the trailer vehicle in a simple and most reliable manner with the action of the braking being transmitted to the wheels on each side independently through the shaft units 12 and 14. And a lubricating system and venting system are provided for each of the shaft units to insure correct functioning thereof and eliminate undue wear and avoid a build-up of air pressures.

Of course, while the brake mechanism has been shown and described in a vehicular environment, it is to be understood, as aforestated, that the brake mechanism can be used in the environment of any rotary transmission arrangement or mechanism. Therefore, it is to be understood that the true scope and spirit of the invention is set forth in the appended claims.

What is claimed is:

1. For use with opposing coaxially aligned vehicle wheels or the like, a brake mechanism comprising a housing located between such wheels, a stator mounted vertically within said housing and having opposing faces each containing a series of electrical windings, means for selectively actuating said windings, tubular shaftings extending in opposite directions from and constituting lateral extensions of said housing and having inner and outer end portions, means for rotatably mounting wheels on the outer end portions, shaft units rotatably mounted within the shaftings and each shaft unit having inner and outer ends, rotor units supported on the inner ends of the shaft units for reaction to the electrical energization of the windings on the stator faces so as to thereby effect a braking of the shaft units, bearing support means arranged within the housing for the shaft units and disposed outwardly of the inner ends of such shaft units and the rotor units carried thereby, exteriorly arranged gear casings mounted on the outer end portions of the tubular shaftings, a single line epicycloidal gear assembly operatively connected to and associated with the outer end of each shaft unit and each gear assembly being housed in a planar arrangement within each of the exteriorly arranged gear casings and means for circulating a fluid lubricant over the moving parts of said shaft units, said last means including a series of interconnecting passageways provided in the tubular shaftings and communicating with the gear assemblies which function as pumps to force a fluid lubricant over the moving parts in a continuous fashion.

2. The invention of claim 1 including means provided for each shaft unit for eliminating the build-up of air pressures therein.

3. The invention of claim 2 wherein said last means includes a system for continuously venting each shaft unit to the atmosphere.

4. The invention of claim 1 wherein each of said shaft units is axially extensible so as to compensate for the movements of the rotor units relative to the faces of the stator.

5. The invention of claim 1 wherein each of said shaft units has a separate inner and outer end portion with opposing free ends, the free end of the inner end portion carrying the rotor unit and the free end of the outer end portion carrying the gear assembly, said inner and outer end portions having adjoining ends, and means detachably connecting said adjoining ends together.

6. The invention of claim 5 wherein said last means includes a sleeve within which the adjoining ends are axially housed, a cross pin securing the end of the inner end portion to the sleeve and a spline connection affixing the inner end of the outer end portion to the sleeve whereby said outer end portion is rotatably rigid with the sleeve but is free for axial movement relative thereto.

* * * * *